United States Patent [19]

Osterstrom

[11] Patent Number: 4,674,952
[45] Date of Patent: Jun. 23, 1987

[54] TURBO MOLECULAR PUMP WITH IMPROVED BEARING ASSEMBLY

[75] Inventor: Gordon E. Osterstrom, Evanston, Ill.

[73] Assignee: Sargent-Welch Scientific Company, Skokie, Ill.

[21] Appl. No.: 767,657

[22] Filed: Aug. 20, 1985

Related U.S. Application Data

[63] Continuation of Ser. No. 539,977, Oct. 7, 1983, abandoned.

[51] Int. Cl.$^4$ ............................................. F04D 29/04
[52] U.S. Cl. .................................. 415/170 R; 384/114
[58] Field of Search ................. 415/110, 111, 90, 142, 415/170 R; 384/286, 398, 399, 100, 114, 115

[56] References Cited

U.S. PATENT DOCUMENTS

| | | | |
|---|---|---|---|
| 3,058,785 | 10/1962 | Steele | 384/114 |
| 3,168,977 | 2/1965 | Garnier et al. | 417/423 R |
| 3,392,910 | 7/1968 | Tanzberger | 415/111 |
| 3,399,827 | 9/1968 | Schwartzman | 415/90 |
| 3,549,216 | 12/1970 | Sutyak | 384/115 |
| 3,589,780 | 6/1971 | Thompson | 384/398 X |
| 3,620,639 | 11/1971 | Gaffal | 415/111 |
| 3,644,051 | 2/1972 | Shapiro | 415/90 |
| 3,652,186 | 3/1972 | Carter | 415/110 |
| 3,671,137 | 6/1972 | Ball | 415/111 |
| 3,753,623 | 8/1973 | Wutz | 415/90 |
| 3,832,084 | 8/1974 | Maurice | 415/90 |
| 3,969,042 | 7/1976 | Bachler | 417/354 |
| 4,036,565 | 7/1977 | Becker | 417/420 |
| 4,204,718 | 5/1980 | Bosco | 384/286 |
| 4,215,903 | 8/1980 | Andrews | 384/114 |
| 4,291,926 | 9/1981 | Tomioka et al. | 308/73 |
| 4,342,491 | 8/1982 | Jamison et al. | 384/286 |
| 4,427,309 | 1/1984 | Blake | 384/398 X |

FOREIGN PATENT DOCUMENTS

| | | | |
|---|---|---|---|
| 1426834 | 2/1969 | Fed. Rep. of Germany | 415/112 |
| 1576972 | 7/1970 | Fed. Rep. of Germany | 415/111 |
| 2263612 | 7/1974 | Fed. Rep. of Germany | . |
| 2309665 | 9/1974 | Fed. Rep. of Germany | 415/90 |
| 2413483 | 10/1974 | Fed. Rep. of Germany | 384/114 |
| 212395 | 12/1982 | Japan | 415/90 |
| 165815 | 4/1981 | Netherlands | 415/111 |
| 885954 | 1/1962 | United Kingdom | . |

OTHER PUBLICATIONS

Article entitled "Journal or Sleeve Bearings"–excerpt from *Machinery's Handbook*, Industrial Press, Inc., 1980, pp. 561–575.
Article entitled "Fluid Film Bearings"–excerpted from Mark's *Standard Handbook for Mechanical Engineering*, Eighth Edition, McGraw Hill Book Company, pp. 8-120 through 8-126.
Article entitled "Turbomolecular Vacuum Pumps", excerpted from *Methods of Experimental Physics*, vol. 14, Academic Press, Inc., 1979, pp. 247–273.

*Primary Examiner*—Robert E. Garrett
*Assistant Examiner*—John Kwon
*Attorney, Agent, or Firm*—Lockwood, Alex, FitzGibbon & Cummings

[57] ABSTRACT

A single ended turbomolecular vacuum pump operable in the free molecular flow pressure range having an improved bearing assembly between the motor rotor and the pump rotor discs is disclosed. The improved bearing assembly which is of the "plain" or "sleeve" liquid lubricated type has a relatively high ratio of journal diameter to bearing axial length. The improved bearing assembly is characterized by improved heat transmission capabilities, high tolerance for misalignment and long life.

14 Claims, 5 Drawing Figures

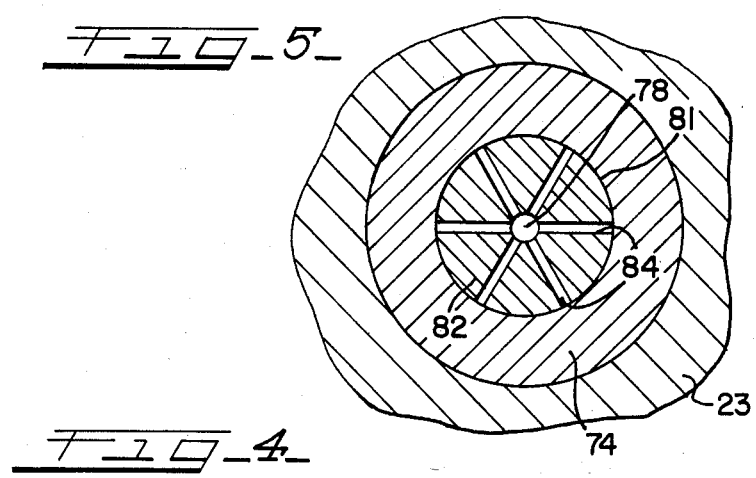
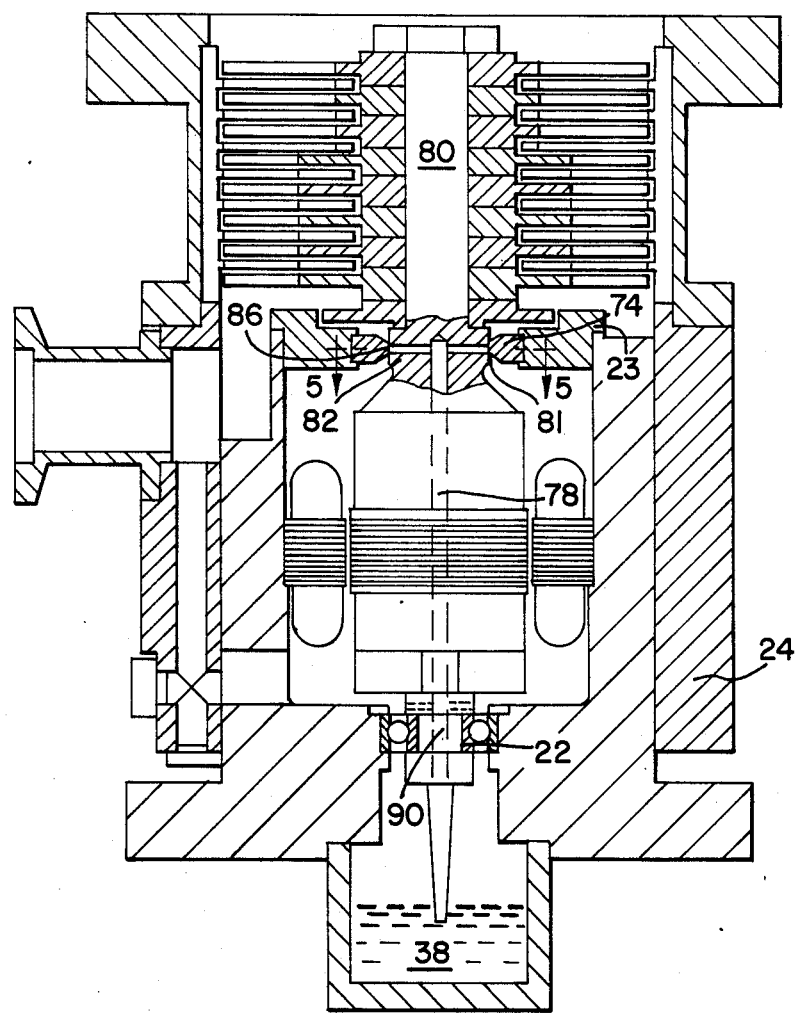

TURBO MOLECULAR PUMP WITH IMPROVED BEARING ASSEMBLY

This application is a continuation, of application Ser. No. 539,977, filed Oct. 7, 1983.

BACKGROUND AND DESCRIPTION OF THE INVENTION

The present invention generally relates to vacuum pumps, and more particularly, to pumps known as turbomolecular pumps characterized by "bladed" rotor and stator construction with running clearances in the millimeter range which are particularly effective in the free molecular flow range. More particularly, this invention is directed to an improved bearing system especially useful for vacuum pumps of the single ended type which have a bearing between the motor rotor and the pump rotor discs. In this regard, an important aspect of the present invention concerns a bearing assembly for a single ended turbomolecular pump which is characterized by improved heat transmission capabilities and a high tolerance for misalignment whereby noise, vibration and wear are minimized and longer bearing life is achieved.

In conventional single ended turbomolecular vacuum pumps, two vertically disposed bearings are commonly employed to support the rotating system with the mass center of the rotating system usually being concentrated at the upper bearing. Maintaining stability in rotating machines of this type requires great care due to the very high rotational speeds which are utilized in these machines. Replacing worn bearings in these machines involves the disassembly of the rotating system which by itself is a laborious and time consuming process. Furthermore, because the natural spin axis is slightly different with each bearing replacement reassembly, the rotor system can never be in perfect balance on its bearings. The bearings must be allowed to "float" in free vibration. A sufficiently compliant bearing mount is therefore required for bearing replacement by the user without rebalancing facilities.

In addition to supporting the rotating system, bearings also serve to conduct heat away from the rotor. Most commercially available turbomolecular pumps employ rotors of aluminum alloy which are subject to loss of strength starting at about 148° C. Since turbolecular pump rotors operate in a thermally insulating vacuum, the only way the rotor can be cooled, without unduly complicating the system, from common heat input such as bearing friction, integral motor losses and gas friction, is by conduction through the bearing lubricant and by radiation.

Heretofore, the majority of turbomolecular vacuum pumps have utilized oil lubricated ball bearings. Other types of bearings such as air film bearings and magnetic bearings have also been employed but have not achieved widespread popularity for a variety of reasons. For instance, the low stiffness provided by magnetic bearings and the complexity of the electronic controls necessary to maintain them result in operational limitations and reliability problems.

Ball bearings are well adapted to the high speed application of turbomolecular pumps because their friction increases only moderately as the speed increases, and they do not generally develop internal instability with increasing speed. Furthermore, they offer a great reserve of strength and rigidity to handle extraordinary air inrush thrust loads. These bearings are located at the discharge side of the rotor disc cascade, and oil vapors associated therewith do not penetrate upstream to the turbo inlet.

However, while the reliability of the ball bearings currently available is very high, the balls orbiting around the axis at very high angular velocity cause substantial contact forces between the balls and raceway which are far greater than those imposed by the rotor alone. Misalignment of the bearing raceways relative to the rotor axis converts these forces to noise, vibration and wear which eventually requires replacement of the bearing. Precise machining and meticulous care in handling and assembling the parts are, therefore, a necessity to minimize misalignment.

In addition to the handling and assembly constraints, the heat transmitting capabilities of ball bearings limit the effective operating range of a turbomolecular pump. Two principal sources of heat input to a turbomolecular pump rotor system are oil friction and gas friction. The gas friction heat input is proportional to the pressure range in which the rotor is operating, i.e. lower gas friction at lower pressures and higher gas friction at higher pressures. The heat generated from gas friction is usually dissipated by the flow of oil through the bearing supporting the rotor. However, the throughput of oil in a typical ball bearing assembly is proportional to both its heat transmission capability and the amount of friction generated by the oil itself.

Therefore, when gas friction heat input is negligible, a ball bearing with minimum oil is best while when gas friction heat input is high maximum oil is best. However, the concommittant effect of increased oil friction with increased oil throughout eventually produces a counter-balancing effect to the heat transmission capability of the bearing which limits the high pressure end of the useful range of the pump and thereby curtails the use of turbomolecular pumps in the higher pressure range often needed for sputter and dry etch applications used in integrated circuit manufacture.

The present invention solves the aforementioned problems by providing an improved bearing assembly of the "plain" or "sleeve" liquid lubricated type which can tolerate far more misalignment than a typical ball bearing without increase in noise, wear, or fatigue damage and which has better heat transmission capabilities than a typical ball bearing. Heretofore such bearings have not been employed in turbomolecular pumps because such bearings having a conventional length to diameter ratio would impose far too much fluid friction drag at the speeds employed in such a turbo pump. In addition to fluid friction drag, oil film bearings are prone to exhibit a hydrodynamic instability known as "whirl" which can produce intolerable vibrations. It has been discovered that when the ratio of journal diameter to bearing length is relatively high, 10:3 or above, the above noted disadvantages are diminished to the point where the friction drag encountered is less than that obtained with a ball bearing of comparable diameter, and a lubricant of comparable viscosity and where there is no appreciable whirl. In addition, this new bearing assembly has the potential for unlimited life and therefore avoids the balancing problems of bearing replacement reassembly.

It is, therefore, a general object of the present invention to provide an improved turbomolecular pump.

Another object of the present invention is to provide a turbomolecular pump with an improved bearing assembly which substantially reduces noise, wear or fatigue damage.

Another object of the present invention is to provide a turbomolecular pump with an improved bearing assembly which has improved heat transmission capabilities thereby extending the useful high pressure range of the pump.

Another object of the present invention is to provide an improved turbomolecular pump of the single ended type which incorporates an oil film bearing assembly.

These and other objects of the present invention will be apparent from the following detailed description taken in conjunction with the following drawings wherein:

FIG. 4 is a vertical cross-section of an alternate embodiment assembled single ended type turbomolecular pump embodying the bearing assembly of the present invention.

FIG. 5 is a plan view of the bearing assembly depicted in FIG. 4.

Although it will be understood that the principles of the invention may be practiced with various pump constructions, the invention will be particularly described herein with reference to an embodiment in which the gas inlet flow is parallel to the axis of rotation of the rotor-stator cascade and then passes out a side port to a forepump.

Figure 1:
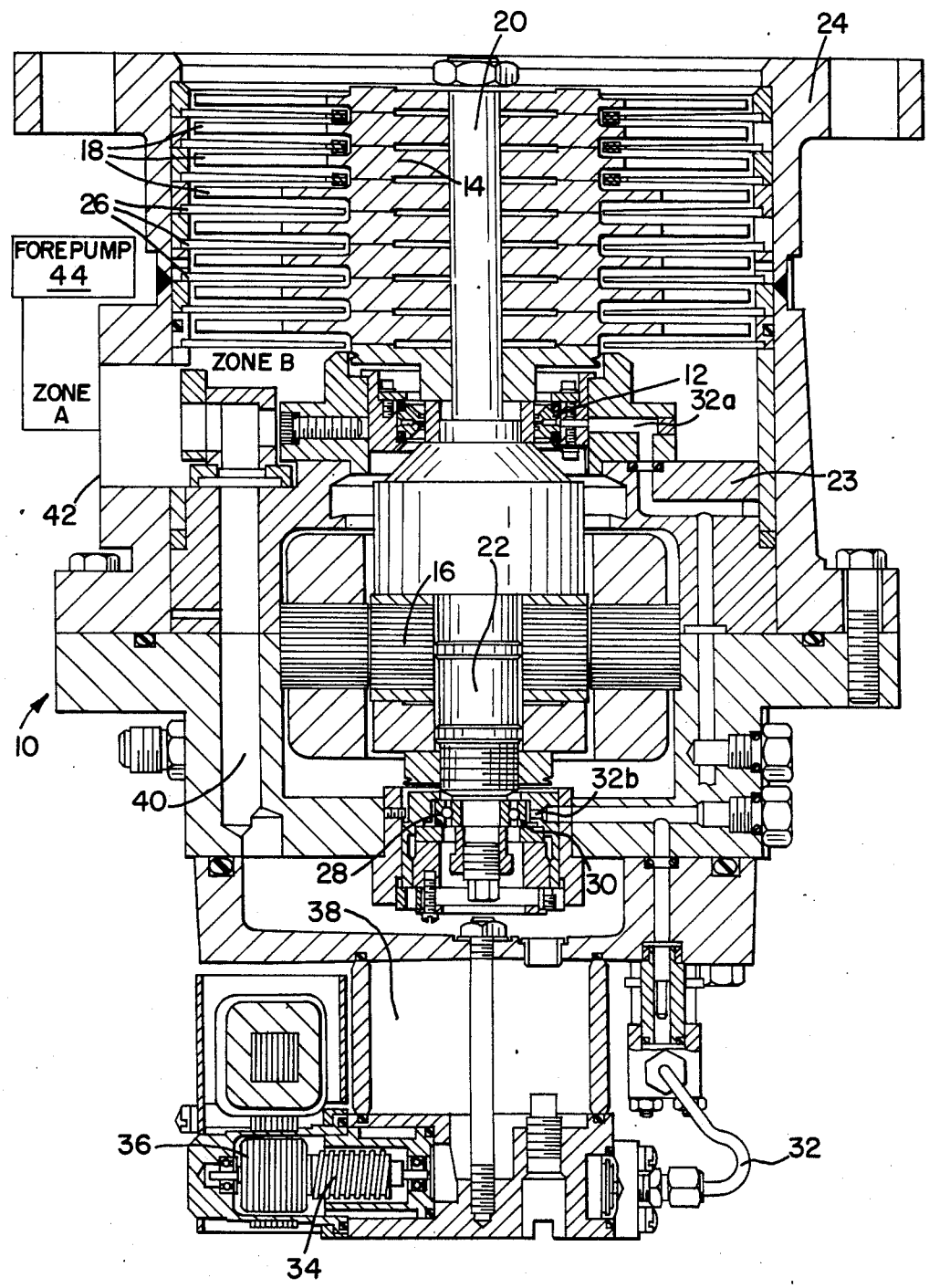
FIG. 1 is a vertical cross-section of an assembled single ended type turbomolecular pump embodying the bearing assembly of the present invention.

Referring now to the drawings in greater detail, FIG. 1 shows a vertical sectional view of a conventional single ended vacuum pump 10 embodying the improved bearing assembly 12 of the present invention. The vacuum pump 10 itself includes a turbomolecular pump rotor assembly 14 and integral electric motor 16 to drive the rotor assembly.

Referring now to the rotor assembly 14 in greater detail, the rotor itself consists of a series of rotating discs 18 which are fixed to a rotor hub 20. The rotating discs 18 are preferably constructed of a high-strength aluminum alloy discs of the Shapiro type as is described in U.S. Pat. No. 3,644,051. The rotor hub 20 is connected directly to the shaft 22 of the electric motor 16 and thereby directly driven.

The rotor assembly 14 and electric motor 16 are assembled into a rigid inner housing 23 which is itself encased in pump outer housing 24. Affixed to the outer housing 24 and positioned so as to be interposed between the rotor discs 18 and immediately adjacent thereto are stator discs 26 having profiles identical to those of the adjacent rotor discs. This interleaving of rotor discs and stator discs forms, as depicted in FIG. 1 for illustration purposes only, an axial flow rotor-stator cascade of 16 stages; eight moving rotor discs 18 and eight stationary stator discs 26.

The combined rotor 14-motor 16 assembly is supported in housing 23 by an upper bearing 12 and a lower bearing 28. The upper bearing 12 which will be described in greater detail below is positioned between the pump rotor 14 and the motor 16 and provides the main lateral restraint for the rotor. The lower bearing 28 located below the motor 16, as depicted, is of the ball bearing type and is mounted on an elastomeric "0" ring 30 to compensate for small eccentricities in the assembly and to provide vibrational damping. Lower bearing 28 has bidirectional thrust capability supports the rotor down weight, and provides emergency air inrush up-thrust resistance. It will be appreciated that the lower bearing 28 can be of any conventional bearing type so long as it provides adequate radial and bidirectional thrust capabilities.

Directly below the motor 16 is an oil pump system 32 which provides lubrication through an upper oil port 32a for the upper bearing 12 and through a lower oil port 32b for the lower bearing 28. The oil pump system preferably includes an oil flow sensor, not shown, for the purpose of shutting off the drive power to the rotor in the event of a loss of lubrication. The lubrication system further includes a worm gear 34 powered by a sealless "canned rotor" motor 36 and an oil reservoir 38 to which the oil drains by gravity through flow passages 40 after leaving the bearings above. It should be noted that other types of oil lubrication systems such as an axial suction system could equally be employed with the current invention.

Turbo pump 10 has an outlet port 42 connected to a forepump 44 through an outlet throttle, not shown. The forepump side, zone "A", of the throttle is at a lower pressure than zone "B", the lower side of the rotor-stator cascade. To reduce the possibility of contamination of the pumping medium by any turbo pump oil, the oily sections of the turbo pump 10 are connected to zone A through flow passages 40 such that, during evacuation, any foam from deaerating oil passes to the forepump and does not rise up through the bearings into the turbo-body cavity of the pump.

With the exception of the new bearing assembly 12, the foregoing described elements of pump 10 as well as those other elements shown in FIG. 1 but not particularly described herein are generally conventional, do not form a necessary part of the invention, and will therefore not be further described in detail herein.

Figure 2:
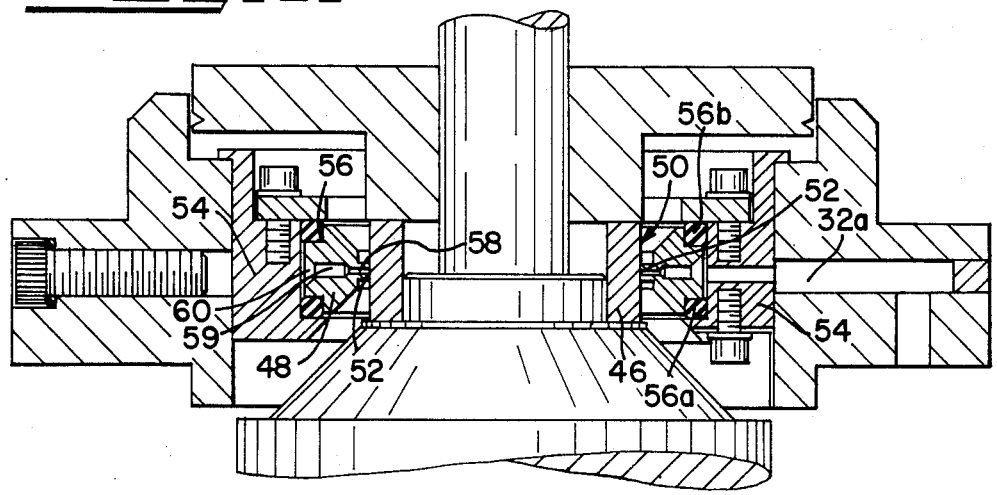
FIG. 2 is a vertical cross-section of a bearing assembly in accordance with the present invention.
Figure 3:
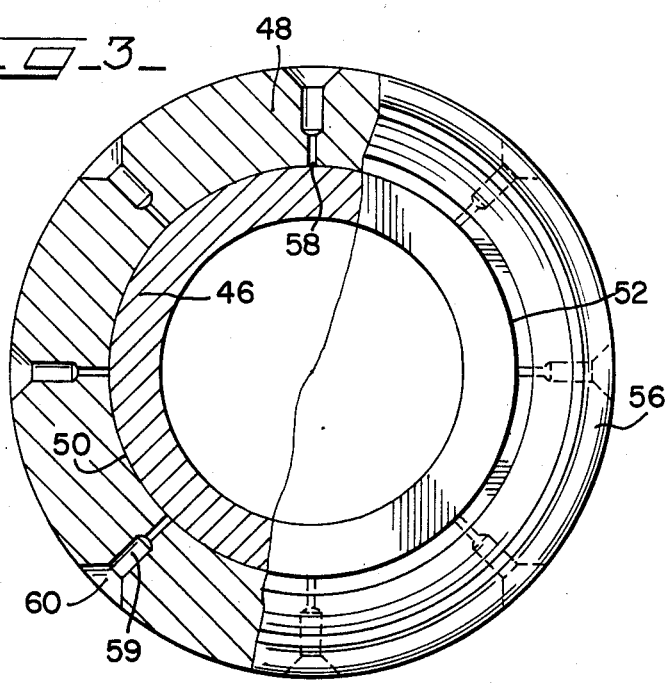
FIG. 3 is a plan view of the bearing assembly of the present invention with a partial cutaway.

Referring now to FIGS. 2 and 3, a bearing assembly 12 of the plain or sleeve type is shown to include journal sleeve 46, a bearing 48, and a lubricant film 50 therebetween.

In the illustrated embodiment, journal sleeve 46 is integrally secured to the hub 20 and shaft 22 assembly by press fitting and co-rotates therewith. The journal 46 is preferably composed of a polished hard steel. It will be appreciated, however, that the hub 20 and shaft 22 assembly can, if suitably dimensioned and polished, serve as the journal itself without the need for a sleeve.

As shown in FIG. 2, the bearing 48 is in the form of an outer ring generally concentric with journal sleeve 46 and includes radially inner bearing surfaces 52 adjacent journal sleeve 46. Preferably the bearing is composed of bronze, although other materials resistant to the corrosive effect of certain high molecular weight gases encountered by turbomolecular pumps such as graphite may be utilized. An outer support structure 54 surrounds the bearing 48 and preferably includes an annular ridge or channel 56 having inner elastomeric support surfaces 56a, 56b thereon. The elastomeric support surfaces are depicted in the preferred embodiment as O-rings 56a, 56b (FIGS. 1, 2). The O-rings 56a, 56b, in a compressed state, are captured between the bearing 48 and the bearing outer support structure 54. The O-rings are capable of additional compression as well as expansion and thereby serve both to dampen any vibration incurred by the rotor assembly and compensate for any shaft or rotor eccentricity that may be encountered.

Journal sleeve 46 and bearing 48 are dimensioned so as to provide a suitable running radial clearance therebetween for lubricant film 50. In this regard, the radial clearance is typically on the order of 1.5 thousandths of an inch (0.0015"), that is the inner diameter of bearing surfaces 52 is typically around 3.0 thousandths (0.003") of an inch greater than the outer diameter of journal sleeve 46. For example, in a pump having an approximate 1.000 inch O.D. journal, the I.D. of the bearing surfaces would be approximately 1.003 inches.

Bearing ring 48 has radial lubricant inlet ports 58 circumferentially disposed to permit the efficient passage of lubricant to the radial clearance between journal sleeve 46 and bearing 48. Lubricant is admitted to inlet ports 58 under pressure from lubricant pump system 32 through inlet channel 59 by way of inlet reservoir 60 in the outer support structure 54. The inlet reservoir 60 and channel 59 are illustrated in the preferred embodiment as having conical and frusto-conical shapes, respectively, whereby the volume of lubricant contained therein is greater than the volume in inlet ports 58. This provides not only additional pressure to induce lubricant flow through inlet ports 58 but also serves as a partial lubricant reserve in the event of loss of lubrication until the pump is shut down. Preferably, inlet ports 58 are axially centered within the bearing surfaces 52 and symmetrically disposed about bearing 48 to provide an effective film of lubricant between the journal 46 and bearing surfaces In accordance with the present invention, the ratio of the axial length of the bearing surfaces 52 to the outer diameter of journal 48 is kept low. A suitable range for this ratio extends from 1:20 to 3:10 with the preferred ratio being about 1:10. This extremely low ratio therefore minimizes the amount of lubricant present at the bearing-journal interface that is subjected to shear in operation so that there is no appreciable whirl effect. Consequently, the reduction of lubricant in shear also reduces the friction heating effect to a lesser value than that of a conventional ball bearing similarly situated. The primary purpose of bearing assembly 12 is to steady the rotor assembly 14 against vibrations as it is brought up to speed and to resist jarring motions of the pump. Structural stability of the bearing assembly 12 is provided by tapering the bearing cross-section (FIG. 2), the outer diameter of the bearing having a greater length than the inner diameter. The rotor asssembly 14 supported by bearing assembly 12 is a relatively light load and hence the low ratio at the bearing inner diameter does not adversely affect the performance of bearing assembly 12 but rather readily allows greater bearing speeds than were heretofore attainable by a liquid bearing. A typical attainable speed is 87 meters/second (approx. 285 ft./sec.) which is more typical of a gas bearing than of a liquid bearing.

When the pressure in the stages of a turbomolecular pump is raised from the molecular to the viscous range, the pressure ratio and pumping speed gradually decrease. The pressure range over which this occurs includes the high process pressures normally encountered in semiconductor manufacture. Previously, to achieve those rotor speeds and pressure associated with the sputter and dry etch techniques of semiconductor manufacture, a blower was required in combination with a pump. Pumps used in such applications that were equipped with conventional ball type bearings encountered discouraging and prohibitive rotor temperatures. The improved heat transfer capability of the present invention allows a single pump to be extended into the high pressure range wherein a blower-pump combination was previously required.

While not being limited to any particular theory of the invention, it is believed that much of the improved performance of the bearing assembly 12 of the present invention is attributable to the efficient lubricant film 50 providing a better heat transfer path than a typical well-oiled ball bearing. Lubricant film 50 can be composed of any typical vacuum pump wetting lubricant including mineral oils, various synthetic hydrocarbons such as synthetic turbine oil mono and diesters, and chemically inert flurocarbons. Typically the lubricant employed will be one chosen having a viscosity in the range of about 7-16 centistokes, with the lower viscosities being preferred. Additionally, the lubricant is preferably supplied under high pressure so as to provide a pressure at the lubricant inlet ports 58 great enough to ensure separation of the bearing 48 and journal 46.

Bearing assembly 12, in addition to having improved heat transmission capabilities, encounters very small internal forces and thereby can tolerate far more misalignment than a typical ball bearing without increase of noise, wear or fatigue. Thus the bearing assembly 12 has the potential for unlimited life and eliminates the problems associated with bearing replacement.

FIGS. 4 and 5 illustrate another embodiment of a vacuum pump utilizing a lubricant film bearing in accordance with the present invention. The lubricant film bearing is used as the pump upper lateral support bearing in combination with a conventional lower bearing assembly. In the drawings, radial lubricant ports are present in the journal member 82 of rotor hub 80 to communicate lubricant to the annular clearance 81 between the bearing 74 and journal members 82. The ports 84 are preferably symmetrically disposed about journal member 82 and radially aligned with the adjacent bearing surfaces 86 so as to form an effective lubricant film bearing with the high lubricant pressure available at the ports 84 assuring separation of the journal member 82 and bearing surfaces 86.

Fluid communication means 90, by way of a conical bore 78 through the electric motor shaft 22 and rotor hub 80 provides a conduit for the transmission of lubricant from a lubricant reservoir 38 to the lubricant ports. The bore 78 extends axially and longitudinally within the shaft 22 and hub 80. Lubricant is transmitted to the bearing surfaces 86 by any suitable oil pump, although a centrifugal oil pump of the hollow spindle type that is commonly used with turbomolecular pumps is especially well suited for use with the present invention.

Accordingly, it has been discovered that, in a turbo-type vacuum pump employing a bearing assembly made according to the criteria set forth herein unexpectedly excellent results have been made possible which were not heretofore believed attainable with standard liquid film bearings or with a typical ball bearing of comparable diameter and with lubricant of comparable viscosity.

While in the foregoing specification certain embodiments of this invention and a number of associated advantages and characteristics have been described in detail, it will be appreciated that modifications and variations therefrom will be apparent to those skilled in the art. Accordingly, this invention is to be limited only by the scope of the appended claims.

What is claimed is:

1. In a single-ended turbomolecular pump adapted to operate in the free molecular flow range in a thermally insulating vacuum, said pump including a rotor assembly driven by a motor and cooperatively associated with a stator assembly, said rotor assembly being mounted to a pump shaft in said motor, an improved bearing assembly for rotatively supporting the vertical pump shaft said bearing assembly including a cylindrical journal sleeve and a bearing member disposed between said motor and said rotor-stator assemblies, said cylinrical journal sleeve having an inner surface which is snugly received on said pump shaft and being co-rotatable therewith, said cylindrical journal sleeve further including an outer substantially uniform surface having a given axial length and given diameter, said bearing member having a generally annular and substantially uniform inner working surface concentrically disposed in a predetermined radial clearance with respect to the outer cylindrical surface of said journal sleeve, said generally annular inner working surface of said bearing member having an axial length which is substantially reduced with respect to the outer diameter of the substantially uniform outer surface of said cylindrical journal sleeve wherein approximately the ratio of the axial length of said inner working surface of said bearing member to the outer diameter of said journal sleeve is from 1:20 to 3:10 and at least one of said bearing member and said journal having a port to admit lubricant fro a lubricant source into said radial clearance for establishing a generally uniform and effective hydrodynamic lubricant film in said radial clearance between the uniform surfaces of said bearing member and said journal sleeve whereby the separation of said bearing member and said journal sleeve, a reduction of lubricant shear in said uniform lubricant film in said radial clearance and a corresponding reduction in heat build-up is obtained, enabling said pump rotor to be operated at higher rotational speeds.

2. The turbomolecular pump of claim 1 wheein the ratio of the axial length of said inner working surface of said bearing member to the outer diameter of said journal sleeve is approximately 1:10.

3. The turbomolecular pump of claim 1 wherein said radial clearance between the outer cylindrical surface of said journal sleeve and the generally annular inner working surface of said bearing member is approximately 0.0015 inch.

4. The turbomolecular pump of claim 1 wherein the pump shaft is co-axially disposed in spaced-away relation to said motor.

5. The turbomolecular pump of claim 1 wherein said pump assembly is vertically disposed with respect to said motor and said bearing assembly.

6. The turbomolecular pump of claim 1 wherein said bearing member includes a body which is radially inwardly tapered to define the working surface of said bearing member.

7. The turbomolecular pump of claim 1 wherein said bearing means further includes means for damping pump rotor vibration and for compensating for eccentricities in said pump rotor.

8. The turbomolecular pump of claim 1 wherein said damping and eccentricity-compensating means includes at least one elatsomeric support surface for said bearing means.

9. The turbomolecular pump of claim 1 wherein said bearing member has a plurality of ports to admit lubricant from said lubricant source to said clearance, said ports being generally symetrically disposed to provide an effective film of lubricant between the outer cylindrical surface of said journal sleeve and the generally annular inner working surface of said bearing member.

10. The turbomolecular pump of claim 9 wherein at least one of said bearing member lubricant ports includes a generally inwardly tapering hollow cross-sectional passageway which communicates with a lubricant reservoir located outwardly with respect to said lubricant port.

11. The turbomolecular pump of claim 1 wherein said journal sleeve has a plurality of ports to admit lubricant from said lubricant source to said clearance, said ports being generally radially and symetrically disposed to provide an effective film of lubricant between the outer cylindrical surface of said journal sleeve and the generally annular inner working surface of said bearing member.

12. The turbomolecular pump of claim 1 wherein said journal sleeve is composed of polished hard steel and said bearing member is composed of bronze.

13. The turbomolecular pump of claim 1 wherein lateral restraint of the rotor is provided by said improved bearing assembly and a second ball bearing assembly is present to provide bi-directioanl thrust capability for supporting said rotor during the initial and continued operation of said turbomolecular pump.

14. The turbomolecular pump of claim 13 wherein said improved bearing assembly is positioned below said rotor-stator assemblies and above asid motor and said second ball bearing assembly is disposed below said motor.

* * * * *

UNITED STATES PATENT AND TRADEMARK OFFICE
CERTIFICATE OF CORRECTION

PATENT NO. : 4,674,952

DATED : June 23, 1987

INVENTOR(S) : Gordon E. Osterstrom

It is certified that error appears in the above-identified patent and that said Letters Patent are hereby corrected as shown below:

Column 4, line 3, insert --,-- after "capability".
Column 7, line 29, "fro" should read --from--.
Column 7, line 40, "wheein" should read --wherein--.
Column 8, line 43, "bi-directioanl" should read --bi-directional--.
Column 8, line 48, "asid" should read --said--.
Column 8, line 14, "elatsomeric" should read --elastomeric--.

Signed and Sealed this

Twenty-seventh Day of October, 1987

Attest:

DONALD J. QUIGG

Attesting Officer

Commissioner of Patents and Trademarks